United States Patent [19]

Troy et al.

[11] Patent Number: 5,599,854
[45] Date of Patent: Feb. 4, 1997

[54] PREPARATION OF BUTADIENE-BASED IMPACT MODIFIERS

[75] Inventors: Edward J. Troy; Anibal Rosado, both of Bristol, Pa.

[73] Assignee: Rohm and Haas Company, Phila, Pa.

[21] Appl. No.: 559,350

[22] Filed: Nov. 16, 1995

Related U.S. Application Data

[62] Division of Ser. No. 349,645, Dec. 5, 1994, Pat. No. 5,534,594.

[51] Int. Cl.⁶ .................... C08F 255/10; C08F 255/08; C08F 257/02
[52] U.S. Cl. .................. 523/201; 524/575; 525/243; 525/244; 525/246; 525/310; 525/902; 526/78; 526/79; 526/86; 526/87; 526/329.1; 526/340; 526/340.1; 526/347; 526/909; 526/911
[58] Field of Search ................ 523/201; 525/310, 525/902; 526/340, 340.1; 524/575

[56] References Cited

U.S. PATENT DOCUMENTS

| | | |
|---|---|---|
| 3,651,177 | 3/1972 | Saito et al. . |
| 3,671,610 | 6/1972 | Amagi et al. . |
| 3,761,455 | 9/1973 | Tanaka et al. . |
| 3,891,592 | 6/1975 | Chauvel et al. . |
| 3,971,835 | 7/1976 | Myers . |
| 4,443,585 | 4/1984 | Goldman ................. 525/310 |
| 4,515,914 | 5/1985 | Tsurumi ................. 523/201 |
| 4,543,383 | 9/1985 | Heil et al. ............... 524/458 |
| 4,624,987 | 11/1986 | Hosoi et al. ............ 525/84 |
| 4,897,462 | 1/1990 | Yusa et al. ............. 528/486 |
| 5,191,008 | 3/1993 | Frost et al. ............. 524/460 |
| 5,294,659 | 3/1994 | Kidder ................... 524/458 |
| 5,334,660 | 8/1994 | Takaki et al. ........... 525/84 |

FOREIGN PATENT DOCUMENTS

| | | |
|---|---|---|
| 3100011 | 4/1991 | Japan . |
| 1103243 | 7/1964 | United Kingdom . |

OTHER PUBLICATIONS

189005 Dec. 20, 1979 Research Disclosure.

*Primary Examiner*—Fred Zitomer
*Attorney, Agent, or Firm*—Roger K. Graham, Patent Agent

[57] ABSTRACT

An improved process for preparing core/shell MBS modifiers is disclosed, wherein by adding feeds of the monomers which form the second and/or third stage polymers prior to completion of polymerization of the earlier stages, a process with substantially reduced polymerization time results with no loss in properties of the product. The process further includes agglomeration of the rubbery polymer to increase particle size during the polymerization process.

7 Claims, No Drawings

PREPARATION OF BUTADIENE-BASED IMPACT MODIFIERS

This is a divisional of application Ser. No. 08/349,645, filed Dec. 5, 1994, U.S. Pat. No. 5,534,594.

For more than 40 years, core/shell emulsion polymers with a core or rubbery stage based on homopolymers or copolymers of butadiene have been used as impact modifiers for matrix polymers such as acrylonitrile-butadiene-styrene (ABS), for styrene-acrylonitrile copolymers, for methyl methacrylate polymers, for poly(vinyl chloride) (PVC) and for various engineering resins such as polycarbonate, polyesters, or polyamides. Preferred versions of such modifiers contain at least one stage or shell of poly(methyl methacrylate), and are known as MBS (methacrylate-butadieneostyrene) core-shell polymers. The processes for preparing such modifiers, especially when it is desired to have most of the resulting emulsion particles of similar particle size, involve either an enlargement of the particle size of the butadiene stage by addition of more butadiene monomer under conditions where formation of new particles is not favored, or the use of agglomerative agents which cause several smaller emulsion particles of butadiene polymer to come together as an agglomerate which behaves like a single larger particle, but which agents do not cause irreversible coagulation of the emulsion. For most commercial uses, it is desirable to have the emulsion particle size above 100 nm., preferably near 200 nm., for optimization of the impact strength performance in the various matrix polymers.

There are deficiencies with both of the above-mentioned processes from a manufacturing viewpoint, in that the enlargement (commonly known as "grow-out") process is a slow process in an expensive pressure kettle, while the agglomerative process usually involves a dilution in emulsion polymer solids and thus a less efficient use of the polymer kettles in terms of weight of polymer produced/hour.

Further, both of these processes, unless pushed to very high conversions by extension of the polymerization time cycle, result in significant amounts of residual volatiles, such as butadiene monomer and butadiene dimer (4-vinylcyclohexene-1). These volatiles must be vented at an intermediate stage in the process, which slows further the overall time of the process, as well as potentially contributing to contamination of the atmosphere if the volatiles are not trapped.

Kidder, U.S. Pat. No. 5,294,659, has disclosed a process for microagglomeration of a butadiene emulsion to a large particle size ( greater than 240 nm.) by addition of a latex of an acrylic polymer containing acid groups during the period when the polymerization of the butadiene is still occurring. However, Kidder does not teach or suggest how to achieve "in-process microagglomeration" without significant lowering of solids due to the high amount of acrylic emulsion which must be added for agglomeration, does not teach how to avoid the adverse effect on optics of a clear blend modified by his mixture of polymers, does not teach grafting of methyl methacrylate, does not teach the process to be effective when the butadiene is fed continuously to the reactor, does not teach how to shorten the process and lower the volatiles by use of over-lapping monomer feeds, and does not teach or suggest how to shorten the process and lower the volatiles in a non-microagglomeration process. Thus the problem remains as how to shorten the polymerization process for core/shell modifiers containing butadiene while at the same time desirably also reducing the volatile content of the resulting emulsion.

We have discovered an improved process to shorten the overall reaction time significantly, and which lowers the volatiles content without venting during the butadiene polymerization process, while producing a core/shell butadiene rubber-based impact modifier with acceptable impact performance in the impact modification of thermoplastics, such as PVC, poly(methyl methacrylate), polycarbonate, polyester, and the like, or combinations of such matrix polymers. Thus we have discovered a process for preparing a core/shell impact modifier which comprises (a) polymerizing in emulsion, in a pressure vessel, a first mixture of monomers, comprising at least 40% butadiene, in the presence of an emulsifier and at least one free-radical initiator, until 60%–90% conversion of the monomers to polymer and a particle size of 120–240 nm. have been achieved; then (b) continuing the polymerization of the first mixture of monomers while adding a second mixture of monomers which mixture comprises at least one of a $C_1$–$C_4$ alkyl methacrylate or a vinyl aromatic monomer; and (c) continuing the polymerization of the second mixture of monomers to at least 80% conversion to polymer. A preferred aspect of the process is the addition of an agglomerating agent during step (a) after 60% –90% conversion of the first mixture of monomers to polymer having a particle size of 70–110 nm. A further preferred process improvement, which allows for better adjustment of the refractive index of the core/shell polymer or for a harder particle surface desired in isolation, comprises during or after step (c), step (d), which is beginning addition of a third mixture of monomers, which mixture comprises at least one of a $C_1$–$C_4$ alkyl methacrylate or a vinyl aromatic monomer; and (e) continuing the polymerization to 60-100% conversion of all monomers present from the second and third monomer mixtures to polymer. These steps (d) and (e) may be repeated one or more times to prepare a four- or five-stage polymer. Additional initiator may be added during any of steps (b), (c), (d) or (e).

It is a further advantage of the present process that the reactor need not be vented throughout the sequence of polymerization reactions, the residual volatiles being reduced by the sequence of monomer additions and polymerization steps.

Agglomeration may be accomplished in several ways, such as by controlled adjustment of solids, by extensive shear of the emulsion, or by carefully controlled addition of electrolytes such as water-soluble salts of inorganic acids such as sodium chloride, potassium hypophosphite, potassium chloride, or sodium phosphate. It is preferred to utilize as the emulsifier an alkali salt of a fatty acid, whether or not agglomeration is employed, and it is separately preferred that the agglomerating agent be an acid, such as hydrochloric acid, acetic acid, or phosphoric acid. If acid is used, it is preferred that, after the agglomeration, sufficient alkali hydroxide be added to restore the pH to the value present prior to the agglomeration step. U.S. Pat. No. 3,761,455 is instructive in this regard. Agglomeration as a method of increasing particle size is preferred because it is more rapid than the "grow-out" processes, although it results in a more dilute final emulsion.

The first mixture of monomers may be polymerized in the presence of a pre-formed polymer dispersion ("seed" latex), for control of desired particle size or for structural modification of the resulting polymer. The "seed" latex is often of small particle size, such as below 100 nm., and of a composition similar to that of the rubbery phase to be formed. The pre-formed polymer dispersion may be a polymer of a rubbery material, such as poly(butadiene), and may be similar or different in composition to the core polymer.

Alternatively, it may be a hard non-rubbery polymer of e.g., polystyrene or poly(methyl methacrylate), present to adjust the refractive index, as taught in Myers et al., U.S. Pat. No. 3,971,835.

The invention further relates to the polymer in dispersed form, commonly referred to as "an emulsion polymer" from any of the above processes, and to the polymers in solid form formed by the isolation of the polymers from the dispersion or emulsion. The invention further relates to blends of the solid polymer with any of a number of polymer matrices, preferably polar polymer matrices, in amounts sufficient to impart improved impact strength, such as from 2 to 40 parts, preferably from 5 to 35 parts, based on the matrix polymer. Such matrix polymers include, for example, poly(vinyl chloride), poly(methyl methacrylate), a poly(alkylene terephthalate), polyacetal, polycarbonate, and mixtures thereof, as well as other well-known thermoplastics and thermosets for which MBS polymers are known to improve impact strength, such as polyamides, epoxy resins, or phenol-formaldehyde thermosets. The invention also contemplates articles of manufacture made from such blends.

The invention further encompasses other structural variations of core/shell polymers, such as "hard core" structures taught in Myers et al., U.S. Pat. No. 3,971,835, wherein a hard-core of poly(methyl methacrylate), polystyrene, or the like, is first prepared, and the butadiene polymer is then prepared in its presence. The process improvements of the present invention may be applied to the butadiene polymerization and the following shell or encapsulation stages.

Further, the invention encompasses having other or additional stages, which are polymerized after the formation of the butadiene polymer is partially completed. Such stages may include a second rubbery stage of butadiene polymer after an intermediate stage of styrene or methyl methacrylate polymer is formed, or an intermediate rubbery stage of a poly(alkyl acrylate), or a fourth or fifth stage of polymer mainly or exclusively form from styrene, methyl methacrylate, or styrene/methyl methacrylate copolymer.

Compositionally, the butadiene polymer may be a homopolymer of butadiene or substantially a homopolymer of butadiene, wherein the only other monomer present may be a low level of a second polyunsaturated monomer for controlling the crosslinking of the polybutadiene. Such polyunsaturated monomers will have at least two reactive carbon-carbon double bonds, that is, bonds which are sufficiently activated or sterically available so that they will copolymerize with the butadiene or any monovinyl or monovinylidene monomers that might be present. Exemplary of such monomers are divinylbenzene, butylene glycol dimethacrylate, trimethylolpropane triacrylate, allyl methacrylate, and diallyl maleate.

The butadiene polymer may also contain other monomers copolymerized with the butadiene such as: other conjugated diolefins, such as isoprene; alkyl acrylates or methacrylates, such as butyl acrylate, methyl methacrylate, or ethyl acrylate; vinyl aromatic monomers, such as styrene, p-methylstyrene, and chlorostyrene; and acrylonitrile. These monomers, including the polyunsaturated monomers, may also be present in any of the other stages.

One of the advantages of these improved processes is that the reactor need not be vented throughout the sequence of polymerization reactions. When vented at the end of the polymerization reaction, the level of released volatiles is significantly lower than those released during in-process or final venting of MBS polymers made by conventional processes.

The free-radical initiators which may be used in the various steps of the process are those conventionally utilized in free-radical polymerizations conducted in the temperature ranges from about room temperature to about 100 ° C. They include thermally-activated initiators, such as persulfates, peroxides, or peroxyesters. They also include "redox" initiators, such as oxidants such as hydroperoxides, persulfates, or peroxides, in combination with reductants such as sodium formaldehyde sulfoxylate, sodium sulfite, sodium hydrosulfite, or isoascorbic acid. Such "redox" reactions may be promoted by such reagents as iron salts.

The emulsifiers are those conventionally used in emulsion polymerization, especially of diene monomers, and include salts of alkyl, aryl, aralkyl, or alkaryl sulfates or sulfonates, alkylpoly(alkoxyalkyl) ethers, alkylpoly(alkoxyalkyl) sulfates, or alkali salts of long-chain fatty acids. If the butadiene polymer latex is to be agglomerated, it is preferred to use an ionic emulsifier, and especially preferred to use a fatty acid soap, which systems, having a pH above 7, may be partially destabilized and microagglomerated by lowering the pH.

The acids used to adjust pH and/or to accomplish agglomeration may be any of a number of organic or inorganic acids, preferably water-soluble, such as hydrochloric, sulfuric, phosphoric, acetic, methanesulfonic, or tartaric. Agglomeration may also be accomplished by controlled addition of salts such as sodium chloride or potassium chloride. It is known to agglomerate with polymeric acids, such as ethyl acrylate/methacrylic acid copolymers, but these tend to cause excessive dilution of the reaction and to create a broader particle size distribution of the agglomerate, sometimes less desirable in certain "clear" applications in polymer blends.

The core/shell polymers may be isolated from emulsion in various ways, the preferred methods being spray-drying or coagulation, such as with electrolyte addition. For certain uses, such as in polymer blends where relatively little emulsion is added and means for removal for water is present in the mixing/blending process, the emulsion may be used directly without separate isolation. Any of various techniques known to the literature, such as U.S. Pat. No. 4,897,462, may be applied to the emulsion during isolation to produce a spheroidal product which, when dried, exhibits outstanding powder flow, low dusting, and higher bulk density than conventionally isolated powders.

Because of the sensitivity of the butadiene polymers to thermal decomposition when dried or processed at high temperature, one or more thermal stabilizers may be added to the core/shell polymer prior to or during isolation, and further prior to or during blending with a matrix polymer.

The uses for such polymers are varied. They may be admixed with poly(vinyl chloride) to improve impact strength for many uses, such as calendered sheet, injection molded articles or extruded articles. When the components are added in a way that the refractive indices are carefully matched, the resulting polymers are useful in clear packaging applications, such as for containers surrounding marketed articles for store use, for packaging food, and for clear bottles for packaging liquids, such as water.

The polymers may be admixed with many other polymeric matrices, such as polymers of methyl methacrylate, with styrene-acrylonitrile copolymers, with aromatic polyesters, such as poly(ethylene terephthalate) or poly(butylene terephthalate), with polycarbonates, with polyamides, or with polyacetals. The utility of such blends is varied, but include equipment panels and housings, such as for appliances or computers and automobile parts such as panels.

In the following Examples, the modifiers are isolated from emulsion either by freeze coagulation of the emulsion, followed by vacuum-oven drying at 60° C. (Method A), or by coagulation by adding the emulsion to a well-stirred 0.3 to 1% hydrochloric acid solution, followed by addition of 1.5 parts of a dilute latex of a MMA/ethyl acrylate (90/10) emulsion, followed by pH adjustment to 5.5, heating of the slurry to 60° C., dewatering the wetcake, re-washing with water, adjusting the pH to 2.7 and re-filtering and drying (Method B). Particle size of the emulsion particles is measured by a Nanosizer BI-90 method. The modifiers are blended in the following PVC formulations on a mill roll; milled for 3.5 minutes after flux at 26/20 (front/rear) rpm at 177° C., then compression molded at 191° C. in a mold pre-heated for 2 minutes under pressure, such as at 80 tonnes (72727 kg) pressure, for 4 minutes, then cooled for 3 minutes at that pressure. In the description of the compositions, a single slash implies a copolymer, while a double slash implies a separate stage.

In Examples 1–6, there has been no effort made to optimize emulsion solids, as it was desired to compare directly the comparative processes known to the art with the process improvements claimed herein.

| PVC Formulations for Testing Physical Properties | | |
|---|---|---|
| Components | Gel Test | Impact/Clarity Test |
| PVC (K-58) | | 100 |
| PVC/PVAc copolymer | 60 | |
| PVC (K = 49) | 40 | |
| Methyltin Mercaptide Stabilizer | 2 | 1.5 |
| Internal lubricant--glycerol monostearate | 0.7 | 0.5 |
| External lubricant--esterified montan wax fatty acid | 1.5 | 0.2 |
| Diisodecyl phthalate plasticizer | 15 | |
| Impact modifier | 5 | 10 or 12 (Examples 1 and 2 only) |
| Toner-blue (1% in PVC) | | 0.06 |
| High MW MMA/EA processing aid | | 1.5 |

The compression molded strips are tested for Izod impact by the method described in ASTM D-256, for light transmission by ASTM D-1003, and for number of gels by a low shear, low temperature milling of the plasticized formulation followed by cutting a strip and extending it two-fold.

EXAMPLES

EXAMPLES 1–2 Grow-Out Process with Comparison to Literature Process

In these examples, an illustration of a process for attaining the desired particle size of the rubbery core polymer by use of a non-agglomeration process and a pre-formed polymer is taken from the literature. The method of Example 1 of Goldman, U.S. Pat. No. 4,443,585 is used, except that styrene replaces butyl acrylate in the core, for production of a modifier more adaptable to clear PVC formulations.

The composition of Example 1 is Bd/St/MMA//St//MMA/EA=50.8/15.2/4//13.5//14.9/1.6, and of Example 2 Bd/St//St//MMA=52.5/17.5//14//16.

Example 1-Comparative Reaction. To an appropriate stirred pressure kettle able to withstand pressure of 1360 kPa (200 psig), and equipped with a pressure blow-out disk, stirrer, means for venting the reactor, means for dropping the formed polymer emulsion to a container, means for recording temperature, means for adding emulsifier solution, means for adding initiator, and means for adding monomers under pressure, is added 5000 parts deionized water, 3 parts of acetic acid, 787.5 parts of a butadiene/styrene (7/3) seed polymer emulsion (35.6% solids) of particle size (p.s.) ca. 64 nanometers (nm.), 59.5 parts of a 28% sodium lauryl sulfate solution, 1.4 parts of cumene hydroperoxide, and 142.8 parts of a 5% solution of sodium formaldehyde sulfoxylate. The mixture is heated to 80° C., the kettle evacuated, and 4319.7 parts of butadiene, 1290.3 parts of styrene, and the remainder of the sodium lauryl sulfate solution(SLS) (306 parts), cumene hydroperoxide (CHP) (26.78 parts), and sodium formaldehyde sulfoxylate solution (SFS) (202.3 parts) are added over a four-hour period, along with 1.79 parts of sodium chloride, all water-soluble components being added as aqueous solutions. The temperature is raised to 95° C. during the first hour, and maintained there for 4 hours. Methyl methacrylate (MMA) (340 parts) is then added over a three-hour period and the emulsion cooled to 65° C., held at that temperature until 95% conversion is achieved, vented to an ice trap (where 6.2 parts of butadiene are collected), and the emulsion cooled to 30° C.

To the latex of butadiene copolymer is then added 1147.5 parts styrene and 82.62 parts of SFS solution. CHP (8.26 parts) is added shotwise over a 75-minute period, then the reaction mixture is held for one hour. SFS solution (1.4 parts) is added, and a mixture of 1266.5 parts MMA and 136 parts of ethyl acrylate are added over one hour, along with 3.08 parts of CHP. The reactor temperature is maintained for 30 minutes, and 14 parts SFS solution and 28 parts t-butyl-hydroperoxide (as a 5% aqueous solution) added over 1 hour in shots, followed by a 20 minute hold. The emulsion is stabilized with an emulsified mixture of 2,6-di-t-butyl-4-methylphenol and epoxidized soybean oil at 1.75% total stabilizer based on the rubber (first-stage content) of the modifier, then cooled to 40° C. and discharged from the reactor. The final solids of the emulsion is 50.6%, and the final particle size 194 nm.

Example 2-Improved Process. In this preparation there is no MMA added to the first-stage polymerization to reduce volatiles, and ethyl acrylate is omitted from the third stage. To the reactor of Example 1 is added 5500 parts deionized water, 3 parts of acetic acid, and 786.56 parts of a butadiene/styrene 7/3 seed polymer emulsion of example 1. The mixture is heated to 75° C., evacuated, and a feed of 365.5 parts of SLS 28% solution, 1.79 parts of sodium chloride, and 371.2 parts of SFS solution, with 500 parts water rinse, added over a period of 6 hours. Simultaneously a feed of 4462.5 parts of butadiene is added over 4 hours, as is a feed of 1486 parts of styrene and 13.86 parts CHP. The temperature is raised to 85°–87° C. during the first hour, and maintained there for 4 hours. The styrene feed is continued for 2 additional hours (1191.5 parts) along with 11.1 parts of CHP, the reactor being cooled to 75° C. by the end of the styrene feed. After holding an additional 30 minutes, at which point a conversion of 90.7% of the styrene had been reached, a feed of MMA (1360 parts) is conducted over 30 minutes, and separate feeds over 3 hours of 2.04 parts SFS solution and 200 parts of a 2% solution of t-butylhydroperoxide (t-BHP), the reactor cooled to 65° C. by the end of the three-hour addition, and the emulsion stabilized. The reactor is cooled to 40° C., vented to a Dry Ice trap as a safety precaution, and the emulsion discharged. There is no butadiene collected after venting. Solids of the resulting emulsion are 49.8%, and the particle size of the emulsion 193 nm. Stabilization is conducted as in Example 1; isolation is by Method A. There are seen improvements in light transmission, impact strength, and "fisheye" content (poorly dispersed modifier as visual defects) for the blend containing the polymer of Example 2 over the blend containing the polymer of Example 1.

| Examples 1 and 2 re U.S. 4,443,585 | | | | |
|---|---|---|---|---|
| Example | Emulsion cycle time, hours | Light transmission % | IZOD impact, J/m, 23° C. | fisheyes in 180 sq. cm. area |
| 1. Comparative | 15 | 65 | 160 | 631 |
| 2. Shortened process | 10.5 | 71 | 1014 | 470 |

EXAMPLES 3–4 Agglomeration Process with Batch Addition of Core Monomers: Comparison to Literature Process The stabilizer system used in this and all following Examples is an emulsified mixture of epoxidized soybean oil, octadecyl 3,5-di-t-butyl-4-hydroxyhydrocinnamate, and the reaction product of 2-t-butyl-5-methylphenol with crotonaldehyde. The method of Takaki et al., U.S. Patent 5,334,660 is used. These examples illustrate the time savings involved when the improved process of the present invention is applied to the process of '660.

Example 3-Comparative Example: The composition is Bd/St/DVB//St/MMA//MMA/St=70(75/25/1)//14/1//14/1. To a reactor as described in Example 1 is charged deionized water 12000 parts, 572 parts of a 15.3% solution of potassium oleate and 167 parts of a 5% solution of tetrasodium pyrophosphate. Then while stirring is added 1250 parts styrene, 80.65 parts of 62% purity divinylbenzene, 15.3 parts of diisopropylbenzene hydroperoxide, 60 parts of a 5% SFS solution, and a solution of 0.33 parts EDTA-2Na, 0.21 parts of 20% NaOH, and 0.2 parts of ferrous sulfate in 100 parts of water, followed by 200 parts of water rinse. After 20 minutes, agitation is stopped, vacuum is applied for 20 minutes, and the re-agitated reactor is then heated to 50° C. while 3500 parts of butadiene is added. The reaction is conducted at 50° for 15 hours, then vented (4.2 parts butadiene collected in a Dry Ice trap), cooled, and discharged.

The emulsion at 28% solids (350 parts solids) is treated with agitation and heated to 70° C., then is added 11.25 parts of a 2% solution of SLS and 105 parts of a 10% solution of KCl. The agglomerated latex is then treated with a mixture of styrene 70 parts, MMA 5 parts and CHP 0.34 parts over a three hour period, held for 30 minutes longer at 70°, then is added 14.7 parts of a 15.3% solution of potassium oleate, 20 parts of a 2.5% solution of NaOH, and 11.25 parts of a 2% solution of SFS. A feed of MMA/St (70 parts/5 parts) containing 0.34 parts of CHP is made over three hours at 70°, the reaction held one more hour at 70°, then stabilized with 53 parts of the above-described stabilizer. The product is isolated from emulsion by the coagulation system (Method B). Solids of the emulsion are 28%, particle size 151 nm.

Example 4-Improved Process. The composition is as in Example 3. To a reactor as described in Example 1 is charged deionized water 8500 parts, 343 parts of a 15.3% solution of potassium oleate and 117 parts of a 5% solution of tetrasodium pyrophosphate. Then while stirring is added 875 parts styrene, 56.5 parts of 62% purity divinylbenzene, 10.7 parts of diisopropylbenzene hydroperoxide, 40.2 parts of a 5% SFS solution, and a solution of 0.25 parts EDTA-2Na, 0.14 parts of 20% NaOH, and 0.14 parts of ferrous sulfate in 100 parts of water, plus 200 parts of water rinse. After 20 minutes, agitation is stopped, vacuum is applied for 20 minutes, and the re-agitated reactor is then heated to 50° C. while 2625 parts of butadiene is added. The reaction is conducted at 50° for 6 hours (75.9% conversion), then the temperature is increased to 70°, while a 10% solution of potassium chloride (1225 parts plus 300 parts water rinse) and a 2% solution of SFS (113 parts) are added rapidly. The agglomerated latex is then treated with a mixture of styrene 700 parts, MMA 50 parts and CHP 3.3 parts over a three hour period. There then is rapidly added 228 parts of a 15.3 % solution of potassium oleate, and 200 parts of a 2.5% solution of NaOH, followed by 500 parts water rinse. A feed of MMA/St (700 parts/50 parts) containing 0.38 parts of CHP is made over thirty minutes at 70°, followed by 1000 parts water rinse. Slower feeds of 169 parts of 2% t-BHP solution in water and 112.5 parts of 2% SFS are made over 3 hours, and the reaction is cooled, then stabilized with the above-described stabilizer, then vented for safety reasons to a Dry Ice trap (no butadiene is collected). The product is isolated from emulsion by the coagulation system (Method B). Solids of the resulting emulsion are 27.5%, (but the emulsion will be of such low viscosity that a higher emulsion solids could have been obtained had it not been desired to repeat the prior art example), and the particle size 151 nm.

The improved process of Example 4 is seen to be significantly shorter in time, to produce product of improved impact strength in PVC, and to decrease the "fisheye" content of the PVC when compared to the modifier from Example 3.

| Examples 3 and 4 re U.S. Pat. 5,334,660 | | | | |
|---|---|---|---|---|
| Example | Emulsion cycle time, hours | Light transmission % | Izod impact, J/m, 23° C. | fisheyes in 180 sq. cm. area |
| #3. Comparative | 25 | 75 | 747 | 173 |
| #4. Shortened process | 13 | 72 | 1174 | 4 |

EXAMPLES 5–6 Process with Gradual Addition of Core Monomers

This example illustrates the comparative preparation by a "standard" and a shortened process of a Bd/Sty//St//MMA three-stage core-shell polymer of composition (52.5/17.5// 14//16) by a process wherein "grow-out" is conducted during the polymerization of the first-stage monomers to achieve the desired particle size. In the following, all parts are the amounts of solid material added; there will be extra water added when a dilute aqueous solution is fed or added.

Example 5-Comparative Example. To an appropriate stirred pressure kettle able to withstand pressure of 1360 kPa (200 psig), and equipped with a pressure blow-out disk, stirrer, means for venting the reactor, means for dropping the formed polymer emulsion to a container, means for recording temperature, means for adding emulsifier solution, means for adding initiator, and means for adding monomers under pressure, is added 9500 parts of de-ionized water, 3.15 parts of trisodium pyrophosphate (as a 5% aqueous solution), 0.07 parts of ferrous iron-ethylenediaminetetraacetic acid, 583 parts of a 35.6% solids, 64 nm. p.s. 7/3 Bd/St latex, and 0.7 parts of NaOH. The mix is heated to 90° C. with stirring, then sealed and evacuated.

A feed of styrene 875 parts and butadiene 2625 parts is begun over 4 hours; separate feeds of (a) 612 parts of 2% aqueous t-butylhydroperoxide (t-BHP) and (b) a mix of 572 parts of 15.3% aqueous potassium oleate and 175 parts of 5% SFS are continued over 7 hours. The reactor is held at 85°–87°. After 96% conversion is achieved (7 hours or more), the reactor is vented (with 30 parts of butadiene being collected in a Dry Ice trap), the contents are kept at 85° and separate feeds of styrene (700 parts), 122.5 parts of 2% t-BHP and 87.5 parts of 2% SFS are made over 3 hours. During the last hour, the reactor is cooled to 75°. Then 100 parts of 2.5% NaOH is added, followed by a feed of 900 parts MMA over 30 minutes, with separate feeds of 180 parts of 2% t-BHP solution and 120 parts of 2% SFS conducted over 3 hours. The reactor is cooled to 65° in the last hour, the emulsion is stabilized with the stabilizer described for Examples 3 and 4, and is coagulated by Method B. Solids are 30%, and final particle size is 182 nm.

Example 6-Improved Process. To the reactor of Example 5 is added 10600 parts of de-ionized water, 3.15 parts of trisodium pyrophosphate (as a 5% aqueous solution), 0.07 parts of ferrous iron-ethylenediaminetetraacetic acid, 583 parts of a 35.6% solids, 64 nm. p.s. 7/3 Bd/St latex, and 0.7 parts of NaOH. The mix is heated to 90° C. with stirring, then sealed and evacuated. The temperature is lowered to 75° while a feed of styrene 875 parts (containing 8.2 parts t-BHP) and butadiene 2625 parts is begun over 4 hours; a separate feed of a mix of 572 parts of 15.3% aqueous potassium oleate and 210 parts of 5% SFS are continued over 7 hours. The reactor is raised to a reaction temperature of 85°–87 ° during the first feed hour. After 4 hours, the contents are maintained at 85° and a feed of styrene (700 parts, containing 6.5 parts of t-BHP) is continued for 3 hours. During the last hour, the reactor is cooled to 75°. Then 160 parts of 2.5% NaOH is added, followed by a feed of 900 parts MMA over 30 minutes, with separate feeds of 180 parts of 2% t-BHP solution and 120 parts of 2% SFS conducted over 3 hours. The reactor is cooled to 65° in the last hour, the emulsion is stabilized with the stabilizer described for Examples 3 and 4, is vented to a Dry Ice trap (no butadiene is collected)and is coagulated by Method B. Solids are 29.8%, and final particle size is 181 nm.

As can be seen when comparing Examples 5 and 6, the polymerization cycle of Example 6 is shortened significantly, and the dispersion of the resulting modifier in PVC is improved. Impact strength and clarity are maintained.

Examples 5 and 6 re Seed Growout at 85° C.

| Example | Emulsion cycle time, hours | Light transmission % | IZOD impact, J/m, 23° C. | fisheyes in 180 sq. cm. area |
|---|---|---|---|---|
| 5. Comparative | 14 | 72 | 1121 | 386 |
| 4. Shortened process | 11.5 | 72 | 1121 | 16 |

EXAMPLE 7 Further Grow-Out Process Description

This example illustrates the preparation of a Bd/Sty//St//MMA three-stage core-shell polymer of composition (52.5/17.5//14//16) by an improved process wherein enlargement (grow-out) is conducted and where the polymerization of the second-stage monomers is begun without venting and while the first-stage polymerization is not yet complete.

In the following, all parts are the amounts of solid material added; there will be extra water added when a dilute aqueous solution is fed or added. The pre-formed polymer latex added is a approximately 35.6% solids emulsion copolymer of butadiene/styrene (7/3), separately prepared by a conventional initiation process with sodium lauryl sulfate initiator and t-butyl hydroperoxide/sodium metabisulfite initiator; in this example the particle size is 64 nm. The amount is adjusted to control the particle size of the final latex; here the pre-formed polymer is 5.6% by weight.

To an appropriate stirred pressure kettle able to withstand pressure of 1360 kPa (200 psig ), and equipped with a pressure blow-out disk, stirrer, means for venting the reactor, means for dropping the formed polymer emulsion to a container, means for recording temperature, means for adding emulsifier solution, means for adding initiator, and means for adding monomers under pressure, is added 5500 parts of deionized water, which is heated with stirring to 75° C. Then is added 47.6 parts of sodium hydroxide as a 2.5% solution, 991.5 parts of the pre-formed polymer latex (352.97 solid parts), 100 parts water rinse, 107.1 parts of tetrasodium pyrophosphate as a 5% solution (5.36 parts solid), and 0.12 parts of ferrous iron-ethylenediaminetetraacetic acid. The kettle is then evacuated and the temperature adjusted to 68° C.

Three feed streams are then begun: feed I is added over a 7 hour period, feed II is added over a 4 hour period, and 55.5% by volume of feed III over a 4 hour period. Feed I is 18.56 parts (solids) of sodium formaldehyde sulfoxylate as a 5% aqueous solution, 148.75 parts of potassium oleate as a 15.3% aqueous solution, and 100 parts water. Feed II is 4462.5 parts butadiene, and feed III is 2677.5 parts of styrene, 24.99 parts of t-butylhydroperoxide (70% active), plus 200 parts of water rinse. During the first hour of feeds, the temperature is increased to 85°–87 ° C.

After 4 hours, the conversion of monomers is 71.8%. At this time, when the butadiene feed has ended, the remainder of the styrene feed (44.4%) is continued over a 3 hour period. The temperature is increased to 95° C., held there for 1.5 hours, then cooled to 75° C. by the time of cessation of all feeds. The conversion is 92.3%. (This value may be raised to 95% if at the time of cooling, 100 parts of a 2% aqueous solution of t-butyl hydroperoxide is added.)

When 90% conversion is reached, 238 parts of a 5% sodium hydroxide solution is charged rapidly, and three new feeds are begun. Feeds IV and V are added over 3 hours; feed VI over 30 minutes. Feed IV is a 2% solution of sodium formaldehyde sulfoxylate (4.08 grams solids); Feed V is 306 parts of a 2% aqueous solution of t-butylhydroperoxide; Feed VI is 1360 parts methyl methacrylate plus 200 parts of a water rinse, added near the end of the feed. At the end of all feeds, the emulsion is stabilized as in Examples 3 and 4, the reactor is cooled to 40° C. with venting, and trapping of the vented materials in Dry Ice, then discharged to a container. The final pH of the resulting emulsion is 8.4, and the final particle size 172 nm. The emulsion solids are 50.6%.

The reaction is completed in 10 hours. A conventional reaction as taught by the art, wherein the first stage polymer would have been carried to full conversion prior to addition of the second monomers, and venting would have been conducted at that point to achieve pressure relief, would have taken 16–20 hours, and the weight percent solids would have been 50%. U.S. Pat. No. 3,671,610 which teaches a similar three-stage polymer made by an enlargement process with all the butadiene in the reactor at the time of initiation reports cycle time of 17 hours to prepare the first-stage core latex, then 5.5 hours for the polymerization of the styrene stage, and 5.5 hours to complete the third-stage polymerization, or a total of 28 hours to completion. Based on the numbers in '610, the present Example represents significant savings in reaction time, with resultant energy savings.

EXAMPLES 8–10 Variations in Final Particle Size

In a manner similar to Example 7, polymerizations are carried out with varying amounts of pre-formed polymer. In Example 8, the weight of pre-formed polymer is 4.5% and the final particle size is 183 nm.; in Example 9, the weight of pre-formed polymer is 6.7% and the final particle size is 166 nm.

In Example 10, a composition of 78 parts rubber, 10 parts styrene, and 12 parts MMA is prepared from 5.8% pre-formed polymer of particle size 64 nm. in a similar manner over the same 10 hour feed period, yielding a 51.4% solids emulsion at particle size 168 nm.

EXAMPLE 11 Further Exemplification of "In Process" Agglomeration with Monomer Feed This example illustrates the preparation of a Bd/Sty//St//MMA three-stage core-shell polymer of composition (58.5/19.5//10//12) by a process wherein agglomeration is conducted during the polymerization of the first-stage monomers. In the following, all parts are the amounts of solid material added; there will be extra water added when a dilute aqueous solution is fed or added. To the reactor described in the previous experiments is added 5400 parts of de-ionized water, 14.82 parts of trisodium pyrophosphate (as a 5% aqueous solution), 0.15 parts of ferrous iron-ethylenediaminetetraacetic acid, 100.4 parts of potassium oleate (as a 15.3% aqueous solution), and 29.64 parts of sodium formaldehyde sulfoxylate (as a 5% aqueous solution). The reactor is swept with nitrogen and heated to 85°–90 °C. while stirring at 125 rpm. The reactor is then sealed and vacuum applied. Three feed streams are then begun: feed I and feed II are added over a 5 hour period, and feed III over a 10 hour period. Feed I is 1852.5 parts of styrene; feed II is 5557.5 parts butadiene; feed III is 407.55 parts of a 10% aqueous solution of t-butylhydroperoxide.

At the end of 5 hours, the stirring is reduced to 100 rpm. At this point the conversion to polymer is 73% of the monomers charged, and the particle size is 107 nm. A 10% aqueous solution of 5.56 parts of sodium dodecyldiphenylether monosulfonate is added as quickly as possible, then a feed of 1037 grams of a 2.5% acetic acid solution is made over a 15 minute period. The reaction is held for 2 minutes, then 18.53 parts of sodium hydroxide is added as a 2.5% aqueous solution over 15 minutes, at which point the pH is 9.5 to 10. Then 286.8 parts of the aqueous solution of potassium oleate is added as quickly as possible. The particle size is now 159 nm.

With stirring speed at 150 rpm, a feed of 950 parts of styrene and a separate feed of an aqueous solution containing 9.5 parts of potassium oleate are commenced, which runs over a period of 3 hours. In the last ½ hour of the feed, the temperature is cooled to 65 °C. The particle size is now 173 nm. Then 136.8 parts of a 2.5% solution of sodium hydroxide is added rapidly, followed by a mixture of sodium formaldehyde sulfoxylate 2.28 parts as a 6% aqueous solution, 0.075 parts of ferrous iron-ethylenediaminetetraacetic acid, and 182.05 parts of the solution of potassium oleate. A feed of methyl methacrylate (1140 parts) containing 2.28 parts of 70% t-butylhydroperoxide is added over 90 minutes, followed by a final rinse of 100 parts of water. A 1% solution of t-butylhydroperoxide is then added over a 90 minute period, followed sampling and holding until substantially 100% conversion is achieved. The reaction is then stabilized as in Example 3, then vented to an ice trap, then cooled to ca. 40° C. and discharged to a container. The final pH is 8.8, the final particle size 176 nm., and 0.81% gel is found after screening the final emulsion through cheese-cloth. The modifier stabilized as in the previous Examples is an effective impact modifier in the clear PVC formulation taught previously.

The reaction is completed in 11 hours. A conventional reaction as known to one skilled in the art, wherein the first stage polymer is carried to full conversion prior to micro-agglomeration of the butadiene latex (and then followed by addition of the second and third monomer feeds), with venting being conducted at the time of micro-agglomeration to achieve pressure relief, will take 16–20 hours.

We claim:

1. A polymer product which is a core/shell impact modifier produced by a process which comprises:
    a. polymerizing in emulsion, in a pressure vessel, a first mixture of monomers, comprising at least 40% butadiene, and further comprising at least one polyunsaturated monomer for controlling the crosslinking of the polybutadiene, in the presence of an emulsifier and a free-radical initiator,
    b. adding an agglomerating agent after 60%–90% conversion of the first mixture of monomers to polymer having a particle size of 70–110 nm,
    c. continuing the polymerization until 60%–90% conversion of the monomers to polymer and a particle size of 120–240 nm. have been achieved;
    d. continuing the polymerization of the first mixture of monomers while adding a second mixture of monomers which mixture comprises at least one of a $C_1$–$C_4$ alkyl methacrylate, and
    e. continuing the polymerization of the second mixture of monomers to at least 80% conversion to polymer.

2. A polymer product which is a core/shell impact modifier produced by a process which comprises:
    a. polymerizing in emulsion, in a pressure vessel, a first mixture of monomers, comprising at least 40% butadiene, and further comprising at least one polyunsaturated monomer for controlling the crosslinking of the polybutadiene, in the presence of an emulsifier and a free-radical initiator, until 60%–90% conversion of the monomers to polymer and a particle size of 120–240 nm. have been achieved;
    b. continuing the polymerization of the first mixture of monomers while adding a second mixture of monomers which mixture comprises at least one of a $C_1$–$C_4$ alkyl methacrylate or a vinyl aromatic monomer;
    c. continuing the polymerization of the second mixture of monomers to at least 80% conversion to polymer;
    d. during or after step (c), beginning addition of a third mixture of monomers, which mixture comprises at least one of a $C_1$–$C_4$ alkyl methacrylate or a vinyl aromatic monomer; and
    e. continuing the polymerization to 60–100% conversion of all monomers present from the second and third monomer mixtures to polymer.

3. polymer product of claim 2 wherein an agglomerating agent is added during step (a) after 60%–90% conversion of the first mixture of monomers to polymer having a particle size of 70–110 nm.

4. The polymer product of claim 2 or claim 3 wherein steps (b) to (e) are repeated one or more times.

5. The polymer product of claim 1 wherein steps (d) and (e) are repeated one or more times.

6. A thermoplastic blend of a matrix polymer selected from poly(vinyl chloride), poly(methyl methacrylate), a poly(alkylene terephthalate), polyacetal, polycarbonate, and mixtures thereof with from 2 to 40 parts, based on 100 parts of the matrix polymer, of the polymer product produced by any of the processes of claims 1, 2, 3, 4, or 5.

7. An article formed from the blend of claim 6.

* * * * *